United States Patent [19]

Aubele et al.

[11] Patent Number: 4,932,116
[45] Date of Patent: Jun. 12, 1990

[54] MACHINE FOR PRODUCING FRICTION BEARING PARTS, IN SUCCESSIVE PROCESSING STEPS FROM RIBBON-LIKE COMPOSITE LAMINATE STRIP MATERIAL

[76] Inventors: Edwin Aubele, Beethovenstr, 50, 6204 Taunusstein; Michael Kubert, Im Quellborn 80, 6501 Klein-Winternheim, both of Fed. Rep. of Germany

[21] Appl. No.: 402,240

[22] Filed: Sep. 5, 1989

Related U.S. Application Data

[62] Division of Ser. No. 312,134, Feb. 17, 1989.

[30] Foreign Application Priority Data

Feb. 18, 1988 [DE] Fed. Rep. of Germany ....... 3805036
Feb. 18, 1988 [DE] Fed. Rep. of Germany ....... 3804967

[51] Int. Cl.$^5$ .......................... B23P 23/04; B23P 23/06
[52] U.S. Cl. .......................................... 29/564; 29/558; 29/898.056; 72/404; 72/405
[58] Field of Search .............. 29/33 P, 33 Q, 149.5 R, 29/149.5 C, 149.5 S, 149.5 DP, 527.1, 564, 566, 566.1, 563, 558, 724, 725; 72/404, 405

[56] References Cited

U.S. PATENT DOCUMENTS 3,206,830  9/1965  Hart et al. ...................... 29/149.5 C
3,262,299  7/1966  Hart et al. ................... 29/149.5 C X
3,307,387  3/1967  Lacey, Jr. et al. ............... 72/404 X
3,452,574  7/1969  MacKenzie ....................... 72/404 X
3,724,257  4/1973  Sims et al. ................. 29/149.5 C X

FOREIGN PATENT DOCUMENTS

554046   4/1977  U.S.S.R. ............................... 72/404
747582   7/1980  U.S.S.R. ............................... 72/404
1233998  5/1986  U.S.S.R. ............................... 72/404

Primary Examiner—Timothy V. Eley
Assistant Examiner—Peter D. B. Vo

[57] ABSTRACT

Machine for producing friction bearing shells from ribbon-shaped composite laminate material, wherein the composite laminate material is fed and processed in successive stages at a multiplicity of succesive stations until the shells are finished, except for the slide surface processing. The continuous processing includes chip-generating operations arranged to considerably improve the precision and quality of the friction bearing shells that are produced. The ribbon is blanked to produce individual plates which are disposed transverse to the transport direction, making it possible to work on each individual plate without reaction upon other plates. Scrap and chips are removed, preferably at spacing areas. The shells leaving the continuous production line are finished, except for any processing of the slide surfaces.

13 Claims, 8 Drawing Sheets

MACHINE FOR PRODUCING FRICTION BEARING PARTS, IN SUCCESSIVE PROCESSING STEPS FROM RIBBON-LIKE COMPOSITE LAMINATE STRIP MATERIAL

CROSS REFERENCES TO RELATED APPLICATIONS

This is a division of application Ser. No. 07/312,134 filed Feb. 17, 1989.

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

BACKGROUND OF THE INVENTION

1. Field of the Invention

This invention relates to a method for producing semi-cylindrical friction bearing parts or shells from ribbon-like composite laminate material, wherein the composite laminate material is fed to a processing line and subjected, in a multiplicity of successive stations of a processing machine, to various processing steps, each designed as a work stroke, until the friction bearing parts are finished, except for machining of their sliding surfaces. The parts are transported or fed for this purpose, from one station to another of the processing line.

The invention also relates to a machine for the execution of this method, in which there are provided a common drive mechanism for the simultaneous automatic opening and closing of dies in the various stations, and a powered transporting mechanism for the composite laminate material and the workpieces formed thereof, which transporting mechanism traverses the series of successive stations.

2. Description of the Related Art Including Information Disclosed Under 37 CFR §§1.97–1.99

Methods and machines of this kind, namely for the manufacture of friction bearing parts, in which a ribbon of laminate material is processed into friction bearing parts in a multi-station processing line are already known. Reference is made to German Printed Application No. DE-AS 1 677 165, German Publication No. DE-OS 2 174 633, German Printed Application No. DE-AS 2 235 933, U.S. Pat. No. 3,206,830, British Patent No. 336,333, and British Patent No. 663,476. In all of these known methods and machines the ribbon material is subjected to a considerable number of machining operations before being cut into individual plates or friction bearing elements. The drawback thereof is that the dimensional changes resulting from the various machining operations, in particular stamping and upsetting operations on the ribbon material, are additive in the direction of ribbon travel. More specifically, as the length of the processed ribbon material is increased, due to an increase in the number of machining stations, the alignment accuracy of the ribbon with respect to the tools or dies contained in each station becomes more and more imperfect. But it is of decisive importance for precision machining that there be exact alignment of the ribbon section that is being processed with respect to the tools or dies contained in each station. As a further drawback, it must be added that machining operations involving chip removal from a continuous ribbon of material cannot be effectively carried out in practice, due to problems in guiding of the unprocessed ribbon material, and the inaccessibility of cutting tools to the workpiece. Furthermore, it was hitherto impossible to remove the chips generated from the ribbon material with the required safety and completeness, as is necessary for a safe and exact completion of the work cycle, and for the attainment of adequate precision. While it is known from German Publication No. DE-OS 29 30 435, in a comparable method, to produce friction bearing parts by first scribing plates by impressing transversely extending grooves into the continuous ribbon material, and then machining the ribbon material in the area of the individual plates, and thereafter before the final forming of the semi-cylindrical friction bearing parts, deepening the impressed groove substantially on one side of the ribbon material by means of a cutting tool moved transverse to the ribbon material, this prior method is not practical because in order to be able to transform the frontmost, scribed plate into a semi-cylindrical friction bearing part and at the same time separate it from the ribbon material, the prior method is not properly engineered for, nor does it achieve, successful machining of the ribbon material or the individual plates cut from the ribbon material by chip removal. This is true regardless of the type of friction bearing part of the sliding layer which is preformed on the ribbon material.

SUMMARY OF THE INVENTION

In contrast to the above problems with prior methods, an object of the present invention is to make possible the correct execution of the various required processing steps in order to produce friction bearing parts with considerably improved precision, and especially to reduce substantially, the occurrence of material displacement when processing individual plates from which the parts are made, as the plates pass through various processing stages. Also, an object is to provide optimal processing methods which are applicable to each processing step. As a result, products of materially improved quality are attainable.

According to the invention, the problems of the prior art methods are solved in that the ribbon material is first cut, at the beginning of the processing, into individual plates lying transverse to the transport direction, one plate for each friction bearing part. These separate plates are transported one after the other, at identical mutual spacing and in common feeding steps, through the processing stations. Between the feeding steps each plate is subjected to a processing step, also including steps for machining the plates by chip removal. After each transport step and before each processing step an alignment of the respective plate or workpiece takes place for the next processing step. The plates, after having been machined by chip removal, are formed into bearing parts of cups (hereinafter also termed "shells") in the processing machine.

The early cutting of the ribbon material into individual plates precludes any adverse affects of one operation from being transferred to a successive operation, either before or after the said one operation. The individual alignment of the plates or workpieces in each station permits carrying out the various operations with great precision. By including "machining by chip removal" in the continuous cycle of operations, those areas which are difficult to shape by forming, or are capable of meeting only low quality standards, are made adaptable to higher quality standards, by the invention. Further, the inclusion of operations involving cutting tools in the continuous cycle of operations also enables carrying out the forming and stamping operations with greater precision and better quality. This is due to the fact that by employing machining by chip removal, the conditions for the execution of a forming or stamping operation are improved, and areas of the friction bearing part or plate which are processed in a stamping or forming operation can be post-treated optimally by cutting tools within the continuous cycle of operations. Also, the operations to be performed simultaneously on the various plates or workpieces can be of a different nature without adversely influencing each other. If for whatever reason, such as tool damage or material faults, errors or defects become apparent on a plate or workpiece, this does not adversely influence the processing of other plates or workpieces. Defective or faulty ribbon sections can be ejected early in the processing, as separate pieces.

The order in which operations are performed on the plates or workpieces can thus be arranged to provide optimal engineering quality, and attainment of precision, with no consideration being required regarding guidance and transport of the ribbon-like stock. As an example, impressing the circumferential grooves provided in the plates can be done prior to forming them into friction bearing parts.

According to the method of the invention, the plates which have been machined by chip removal can now be worked to the final circumferential length, the final axial width, and the final back contour of a bearing part by an upsetting operation while retaining the previously developed plate geometry, in particular the chamfers and groove or grooves. In this respect also, due to the inclusion of chip removing procedures in the continuous cycle of operations, the method according to the invention offers optimal preconditions for the forming or curving of the friction bearing parts or shells, after the required or desired operations involving cutting tools have essentially been carried out on the plates. During curving of the plates previously machined by chip removal, the precision achieved by the metal cutting operations is fully retained by the method of the present invention, and is even increased by the finish-forming or upsetting operation.

The stamping out of any required holes and the incising and/or impressing of arresting elements and the like can be done after the friction bearing parts have been formed in the processing machine, within the scope of the method of the invention.

In carrying out the method according to the invention, there is provided a machine equipped with a common drive mechanism to open or close the dies in the various stations, and having a powered transport mechanism for the composite laminate material and the workpieces formed thereof, which transport mechanism traverses the successive stations.

According to the invention, the transport mechanism is automatic and constructed to be synchronized with the fixtures of the various stations, for the purpose of gripping the individual plates after their having been cut from the ribbon material, and thereafter bringing them, in transport direction, into a fixed relative spacing and transporting them while in this spacing through the processing stations. The operating and actuating devices for the dies and cutting tools are connected to one common drive mechanism of a press for the synchronous automatic actuation of the work strokes, to open and close the dies, said press also furnishing the drive for the transport mechanism. Furthermore, there are incorporated in those stations equipped with cutting tools, devices for intensively cleaning the workpiece blank being treated therein. There consequently results a reliable processing function in this manner, which is engineered to achieve optimal precision in each processing station.

In particular it is assured by the invention that each workpiece, upon leaving a station equipped with cutting tools and during its transportation to the next processing station, is free of any chips or residues, so that processing can continue in the next station without concern about possible adverse contamination of the workpiece. This is especially true where forming or stamping stations are adjacent to stations adapted for machining with cutting tools. The devices for cleaning the plates or workpiece blanks may be of any suitable type within the scope of the invention, e.g. brush and/or suction devices for chips and other residues.

For those tools or dies which move either transverse to the transport direction, or else along the transport direction, by the present invention such motions can be synchronized from the drive mechanism which is provided for the opening and closing of the forming and stamping dies. For instance, the drive mechanism to open and close the forming and stamping dies can contain a crank drive, to whose crankshaft there is connected a driven shaft to generate cutting tool motions that are transverse to or also along the transport direction.

In the machine according to the invention, the circumferential grooves provided in the friction bearing part are readily produced in the plate. Also, the devices that produce such circumferential grooves in the plates are preferably disposed ahead of the station which produces the reference surfaces or faces of the friction bearing parts. The devices that produce circumferential grooves in the plates can contain tools of very diverse kinds, such as carriage tools or cutters which can be disposed in one station or in several stations.

It is preferred, in the machine according to the invention to equip the devices for producing the circumferential grooves with both cutting tools and stamping dies. For example, the devices for producing circumferential grooves can contain tools distributed over three successive stations, namely a fixture for rough-broaching (machining by chip removal) the groove, dies to widen and deepen the groove by stamping in the following station, and thereafter finishing tools, preferably for finish-broaching the grooves, in a third machining station. Another possibility for producing circumferential grooves in the plates is to position various types of tools to be distributed over three successive stations, namely devices for rough-broaching the groove (machining by chip removal) in the plate in a first processing stage, devices for the chip removing, widening and/or deepening of the groove by further broaching in a successive station, and devices for finish-broaching the groove in a successive third station.

For machining the axial faces of the friction bearing parts, the machine according to the invention offers the particularly advantageous execution, in two successive stations, by means of machining devices equipped with cutting tools which can pass between these neighboring stations in a direction which is transverse to the transport direction, at the same time being guided along the lateral edges of the plates that are located in these stations, for the simultaneous machining of these two plates. Chamfers at the faces of the friction bearing parts can be machined in a corresponding manner in two successive stations by means of machining devices with cutting tools which pass transverse to the transport direction between these neighboring stations, at the same time being guided along the lateral edges of the plates located in these stations for the simultaneous machining of these two plates.

The transport mechanism of the machine according to the invention can be equipped with gripping and holding elements engaging reference surface areas and/or face areas of the plates or friction bearing parts. A reliable gripping can thus be attained without deleterious effects on the more sensitive, prepared sliding layer.

The transport mechanism may be led, without interruption, through all stations. It can have two or more sections, such as one section for the transportation of the plates and one section for the transportation of the friction bearing parts formed of the plates.

Other features and advantages will hereinafter appear.

BRIEF DESCRIPTION OF THE DRAWINGS

One embodiment example of the invention is explained below in greater detail with reference to the drawing in which:

FIG. 1 is divided into parts a, b and c.

FIG. 2 is also divided into parts a, b and c.

DESCRIPTION OF THE PREFERRED EMBODIMENT

In the example of FIG. 1, a composite laminate ribbon material 21 is controllably fed to a processing line 27 containing machining stages and one inspection stage, being formed into finished semi-cylindrical friction bearing parts 20, except for machining the sliding surface thereof. The ribbon material 21 contains the layers essential for the friction bearing part 20, namely a carrier layer preferably consisting of steel, and at least one sliding layer of bearing material. In the example illustrated, the width of the ribbon material 21 fed to the processing line is somewhat greater than the circumferential length of the semi-cylindrical friction bearing parts 20 to be produced. The ribbon material 21 is fed, stepwise, in a direction 26 which, in this embodiment, is identical with a direction 22 hereinafter referred to as the transport direction. Each space interval 30 of the workstation is somewhat longer than the desired final axial width X of the friction bearing part 20 to be produced.

Figure 2A:
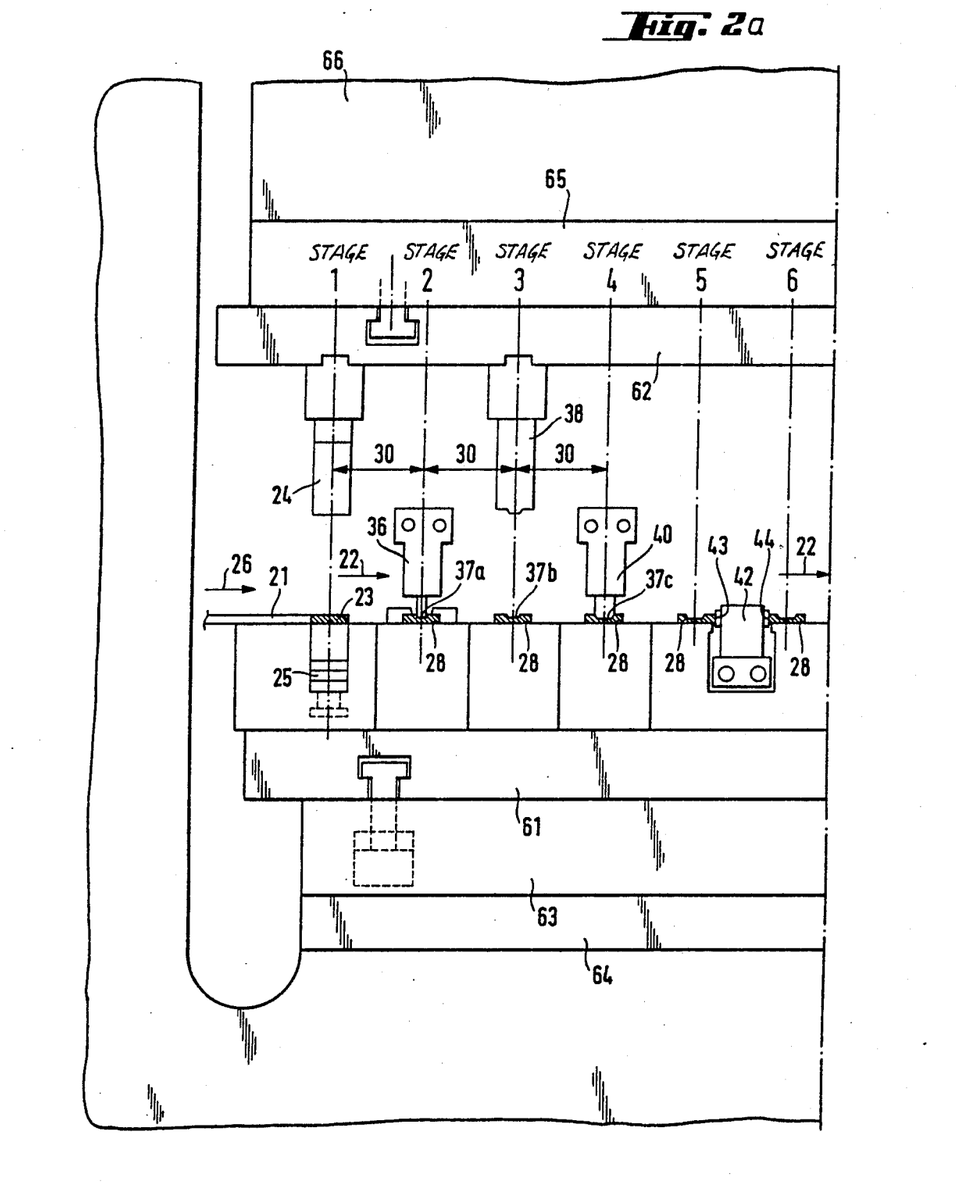
FIG. 2 is a machine for the execution of the method of the invention according to FIG. 1.

In "Stage 1" of the production process by the machine, a strip 23 is separated or cut from the front end of the ribbon material 21 in a stamping/cutting operation. The width of this cut strip 23 corresponds to the length of feed of the ribbon 21 corresponding to one feeding step. As FIG. 2a shows, an upper stamping and cutting die 24, a lower counterpressure die 25, and if required, pressure pads (not shown) are provided for this purpose in "Stage 1" of the machine.

The strip 23, cut off the front end of the ribbon material 21, is tested for integrity in "Stage 1" of the process. If this test reveals a flawed strip, unsuited for the production of a friction bearing part, for instance due to incorrect cutting or material faults, this defective strip is ejected in the form of an individual plate. This occurs in FIG. 1a in the area designated by the double arrow 29 located between "Stage 1" and "Stage 2".

Figure 1A:
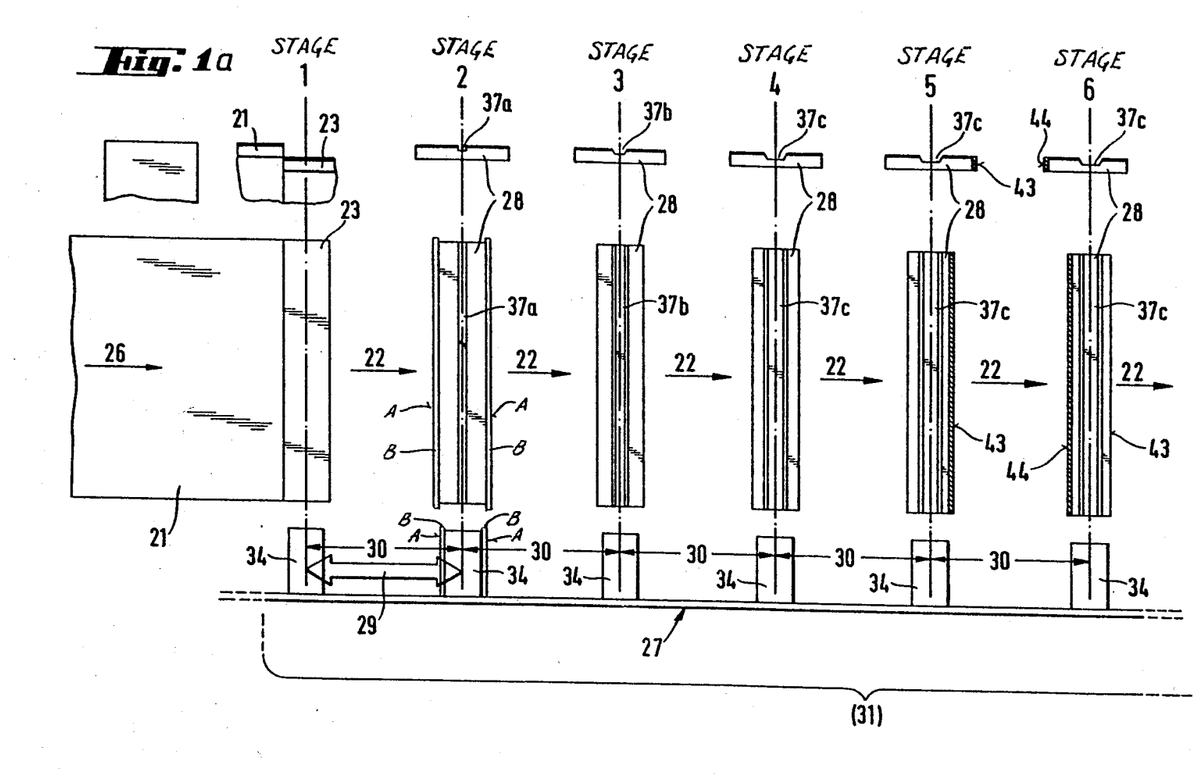
FIG. 1 shows schematically the processing stages of one preferred embodiment of the method according to the invention, starting with a ribbon material, up to the friction bearing part, which is finished, except for machining the sliding surface thereof.
Figure 1B:
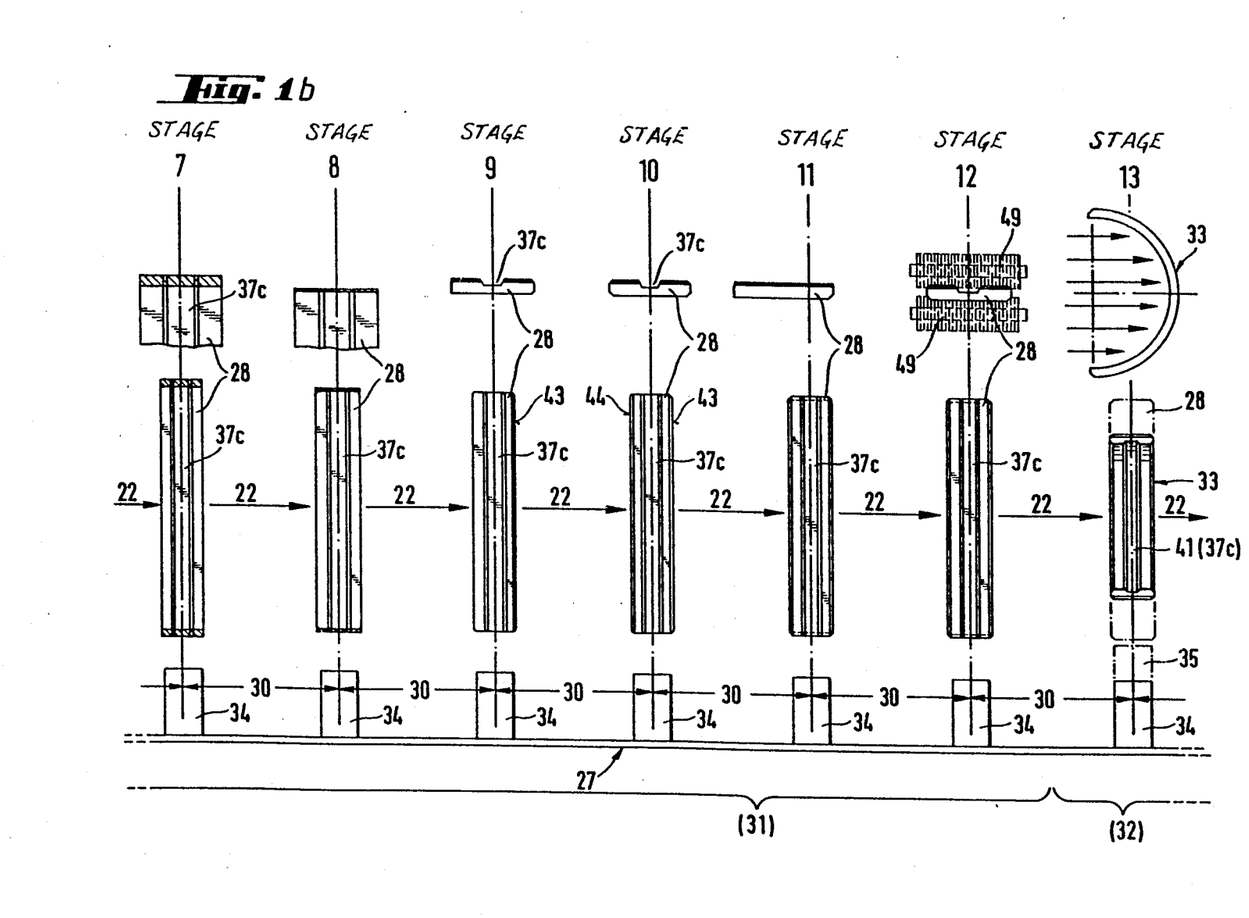
Figure 1C:
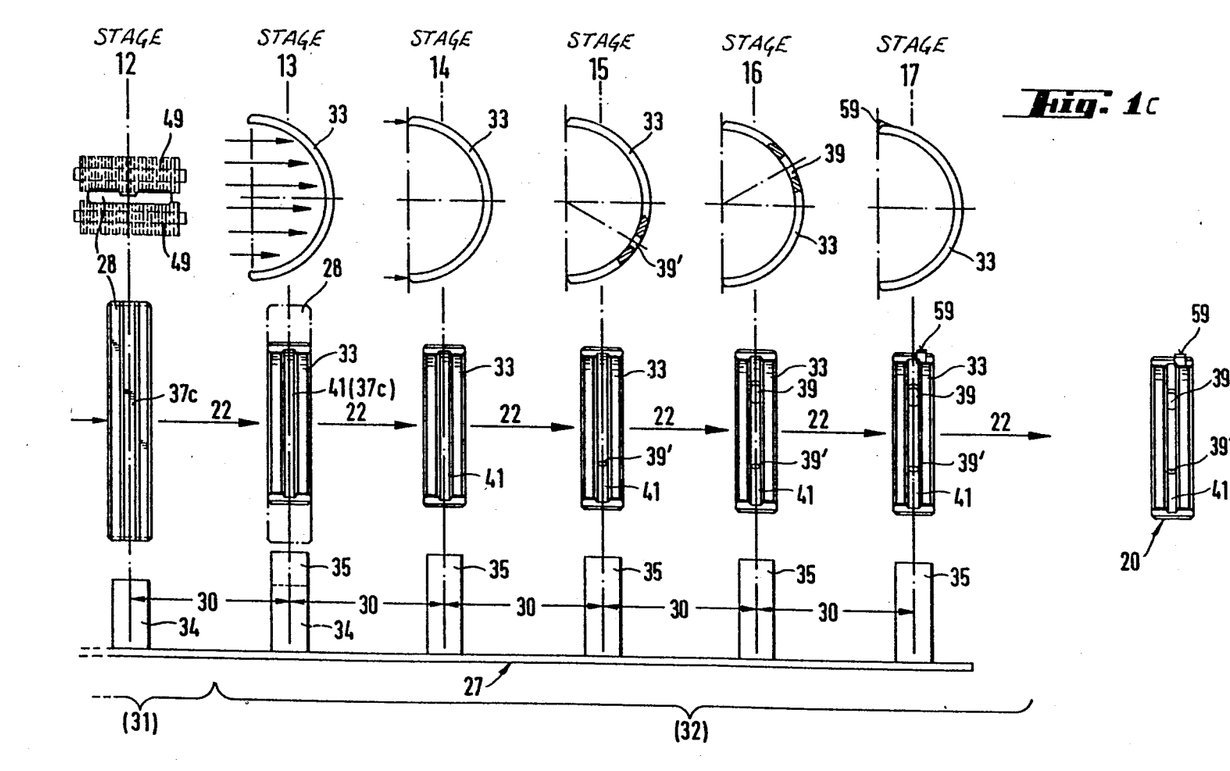
Figure 2B:
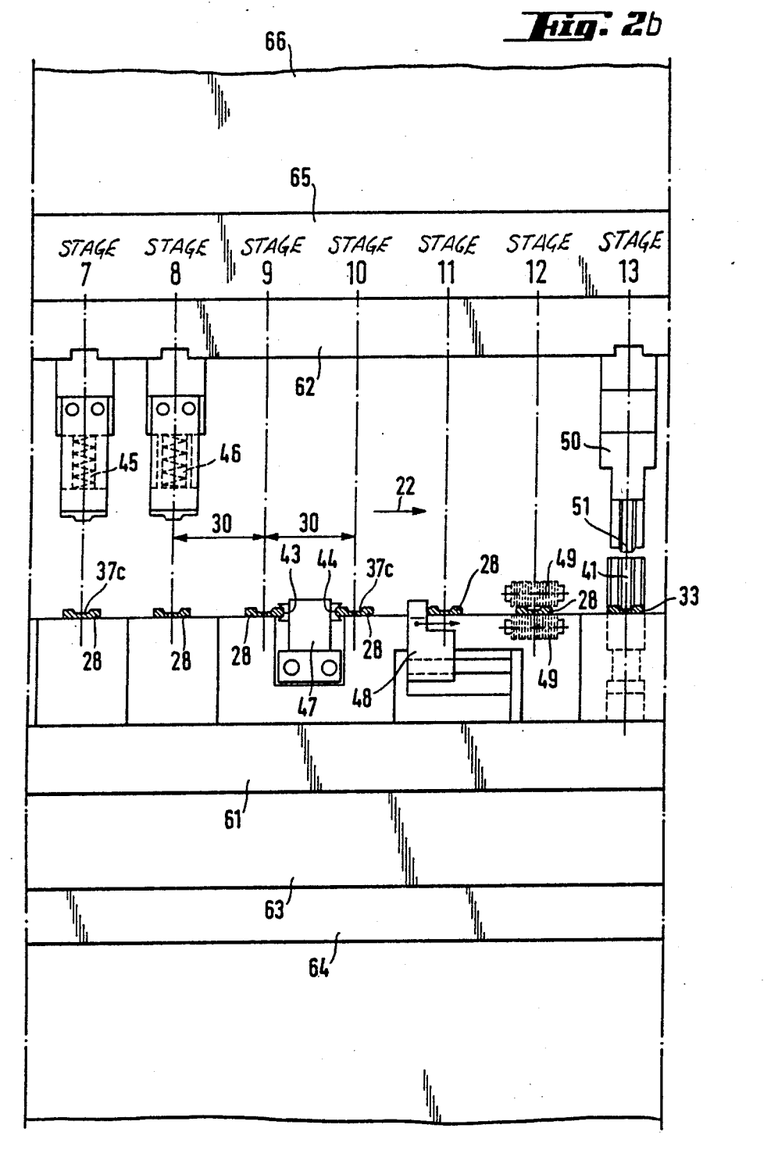

As FIGS. 1 and 2 show, the longitudinally movable transport mechanism 27 is also designed to transport the individual plates 28 and workpieces in the aligned, or transport direction 22 at identical, fixed, mutual spacing 30 through the processing stations, namely the "Stages 2 to 17". For this purpose, the transport mechanism 27 contains two parts or sections 31 and 32, of which the one part or section 31 extends from station "Stage 1", which cuts off the plates 28 or strips 23 from the ribbon material 21, up to station "Stage 13", which forms the plates into semi-cylindrical friction bearing moldings 33. In this part or section 31, the transport mechanism 27 is equipped with gripping and holding elements or nests 34 which overlap the end areas of the plates 28. These gripping and holding elements 34 are shown in FIG. 1 only at one end of each plate 28. Identical gripping and holding elements are also provided at the other end of each one of the plates 28. Holding the plates 28 in a pair of mutually opposite gripping and holding elements 34 such as this does not have to be of too great an accuracy, and the arrangement has been found to be completely adequate to shift the plates between "Stages 3 to 17" and position them in the stations. Exact, precise alignment is then accomplished by aligning devices in the form of oppositely disposed plates A presenting flanges B disposed in each "Stage 3 to 12".

In the example illustrated, the stations "Stage 2", "Stage 3" and "Stage 4" are equipped to form circumferential grooves that are desired in the friction bearing parts. Towards this end, tools 36 for rough-broaching a groove 37a in the plate 28 are mounted in the station "Stage 2". Mounted in the station "Stage 3" are dies 38 to stamp out a deepened and widened groove 37b, i.e. to deepen and widen the initial groove 37a. Finally, in the third station, namely "Stage 4", tools 40 are provided to finish-broach a groove 37c, i.e. to widen and re-profile the groove 37b. The devices for producing longitudinal grooves in the plates 28 (circumferential grooves in the friction bearing parts to be produced) as provided in the stations "Stage 2" to "Stage 4", may be designed to suit any desired shape and number of circumferential grooves and may also be arranged differently. For example, in FIGS. 1 and 2, tools for chip removing machining of the circumferential groove or grooves could also be provided in the station "Stage 2", tools for continued broaching of the groove or grooves in the station "Stage 3", and dies for the finishing of the groove or grooves by stamping the station "Stage 4". It is also possible to equip all three stations of "Stages 2 to 4" with tools for roughing, semi-finishing and finishing the groove or grooves by chip removing operations, such as "broaching-broaching-broaching".

In FIG. 1 the group of stations "Stages 2 to 4" to produce circumferential grooves in the friction bearing parts (longitudinal grooves in the plates 28) is followed by a pair of stations "Stage 5" and "Stage 6". In this pair of stations, the plates 28 placed there by the transport mechanism 27 are fixed in exactly aligned position and machined by chip removal on the mutually opposite axial faces by means of a machining fixture 42 in between the two stations "Stage 5" and "Stage 6", in a broaching operation. This broaching operation takes place at the axial face 43 which, in the transport direction 22, is the front face of the plate 28 located in the station "Stage 5" and at the axial face 44 which, in transport direction 22, is the rear face of the plate located in the station "Stage 6" so that this broaching operation is completed on both axial faces 43 and 44 of plate 28 when it leaves the station "Stage 6".

As FIGS. 1a and 1b show, the station pair "Stages 5 and 6" is followed by two stations "Stage 7" and "Stage 8" for machining of the reference surfaces of the friction bearing parts to be produced. In the station "Stage 7", the plate 28 is cut to length at both ends by means of cutting and stamping tools 45. The remaining length of plate 28 is still somewhat greater than the desired circumferential length of the friction bearing parts 33 to be produced. The scrap generated by these cutting operations is removed safely and completely in the station "Stage 7" so that it cannot interfere with the further course of the processing cycle. Simultaneously with cutting the reference surfaces to length, the designation of the friction bearing parts to be produced is impressed on the back side of the friction bearing parts 28 in the station "Stage 7".

The station "Stage 8" provided for machining the reference surfaces contains devices 46 for shaving and smoothing the previously cut reference surfaces, employing a fine, chip-generating treatment.

Following the two stations "Stage 7" and "Stage 8" for the treatment of the reference surface is another pair of stations "Stage 9" and "Stage 10". In this station pair, the faces 43 and 44 of plate 28 that were formed in the station pair "Stages 5 and 6" are chamfered. Similar to the device between the station pair of "Stages 5 and 6", a fixture 47 which can move transverse to the transport direction between the stations "Stage 9" and "Stage 10" is provided for this purpose. This fixture 47 is designed to chamfer the mutually opposing faces of the plates 28 which were formed earlier in the station pair "Stages 5 and 6". In a manner corresponding to the action in the station pair "Stages 5 and 6", the plate 28 exits "Stage 10" with chamfers on both axial faces 43 and 44.

This station pair "Stages 9 and 10" is followed by a station "Stage 11" which is provided to chamfer the reference surfaces formed in the stations "Stages 7 and 8". Towards this end, this station "Stage 11" contains devices 48 which are movable in transport direction 22 and cause the desired chamfering through fine, chip-generating machining. The plates 28, thus finish-machined, are then transferred by the transfer mechanism of section 31 into the station "Stage 12" which serves the cleaning of the plate 28 and in which are mounted devices 49 such as brushes or washing facilities to clean the plates. The cleaned plates 28 are transferred by the last part of section 31 of the transport mechanism 27 to the station "Stage 13". This station bends, curves and shapes the plate into the semi-cylindrical configuration. In order to retain in this bending operation, the profile and size of the previously produced longitudinal groove, now designated 41, as it is transformed into a circumferential groove, i.e. to retain its geometry, a bending punch 50 provided in the bending station "Stage 13" is designed with a projection 51 engaging the groove 41.

The friction bearing part 33, now essentially in a semi-cylindrical shape, is then transported through additional processing stages by the second part or section 32 of the transport mechanism 27. In this section section 32, the transport mechanism 27 has gripping and holding elements 35 which grip the friction bearing part 33 in the area of the two reference surfaces and which project further than the gripping and holding element 34 in the section 31 of the transport mechanism. In this second section 32, the transport mechanism 27 is equipped with mutually opposite gripping and holding elements 34, of which only one each gripping and holding element 35 being indicated in FIG. 1c.

Figure 2C:
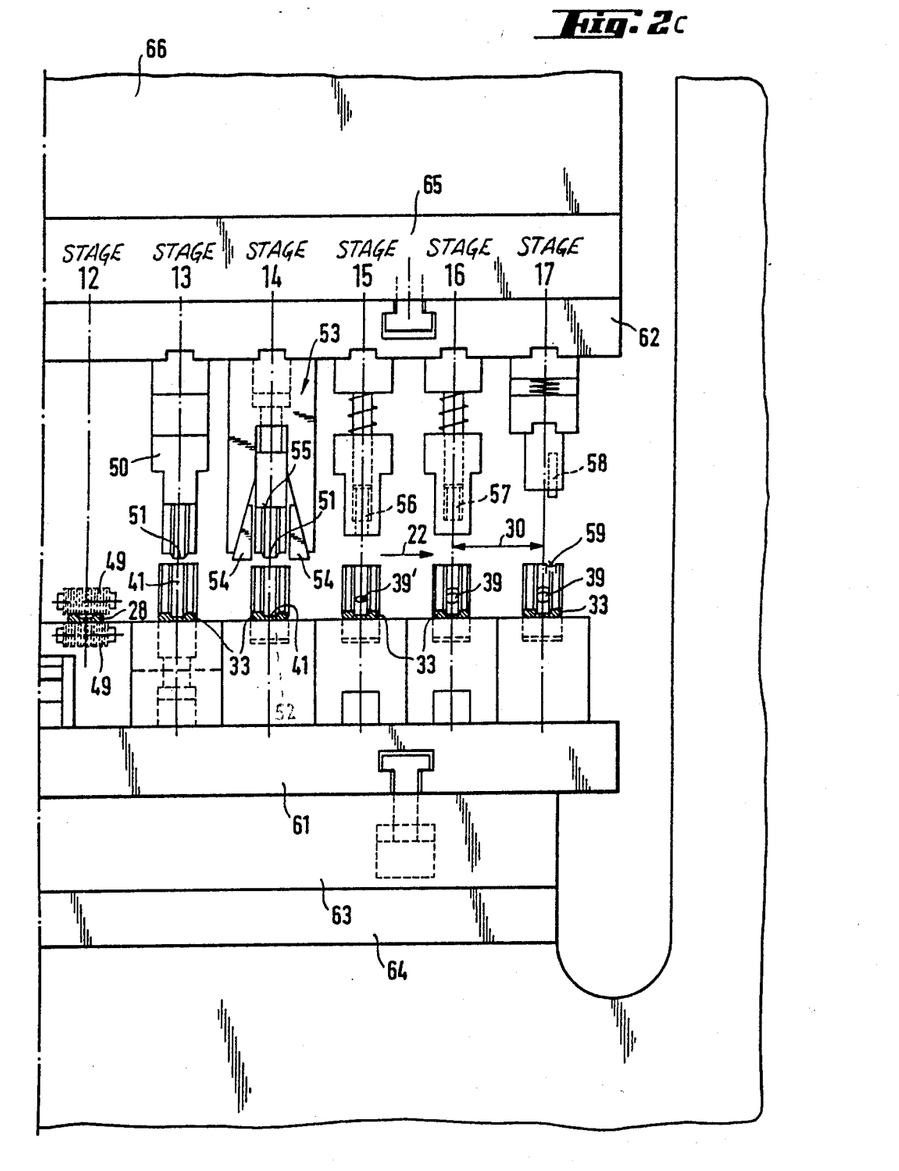

From the bending station "Stage 13", the semi-cylindrical part 33 is transferred to an upsetting station of "Stage 14". It is in this upsetting station that the processed plates 33 are finish-formed to their final circumferential length, their final axial width and their final back contour for the friction bearing parts 20. As FIG. 2c shows, there is provided in the upsetting station "Stage 14" a suitable swaging tool 53 equipped with lateral forming parts 54 engaging the faces, upsetting dies 55 engaging the reference surfaces and a projection 51 engaging the groove 41. A female bending die is indicated at 52.

From the upsetting station "Stage 14" the semi-cylindrical parts 33 are transferred to punching and stamping stations "Stages 15 and 16". These punching and stamping stations "Stages 15 and 16" may be equipped selectively with hole punching dies 56 for round holes 39' or hole punching dies 57 for elongated holes 39. If holes of one type only are to be provided in the part 33, one or the other of these two stations "Stages 15 and 16" may be omitted.

Finally, the friction bearing parts 33 are transferred from the second punching and stamping station "Stage 16" to the station "Stage 17". There, arresting elements 59 are formed in the part 33 by means of appropriate cutting and bending tools 58.

The friction bearing parts now designated 20 leave the last station "Stage 17" in a finished state, except for the machining of the sliding surfaces, and for any additional coatings to be provided which are overlays or run-in layers, applied by electro-plating, or as corrosion protection on all surfaces of the friction bearing part.

As FIG. 2 shows, the devices provided for all stations "Stages 1 through 17" are mounted to a tool base plate 61 and to a top plate 62. The tool base plate is mounted by means of a clamping plate 63, FIG. 3, to a press table 64 while the top plate 62 is mounted via an intermediate plate 65 to a ram 66 of the machine. In this manner, all fixtures of the stations "Stages 1 through 17" are actuated simultaneously by the downward motion of ram 66, and are opened by raising the ram 66. When the ram 66 is raised, i.e. in the open position, the plates 28 and the workpieces 33 are transported by means of the transport mechanism 27 by one step each, i.e. by the distance 30 from one station to the next. By passing through the stations "Stages 2 through 17", therefore, a useable strip 23 of ribbon material 21, formed in the station "Stage 1", has been transformed into a finished friction part 20, except for machining the sliding surface thereof. As shown in FIG. 1, part c, the friction bearing part 20 is outfitted with the desired circumferential groove 41 and possibly round holes 39' and/or elongated holes 39. The back side of the friction bearing part 20 and the axial faces and the reference surfaces have been given their final shape by the upsetting operation.

Figure 3:
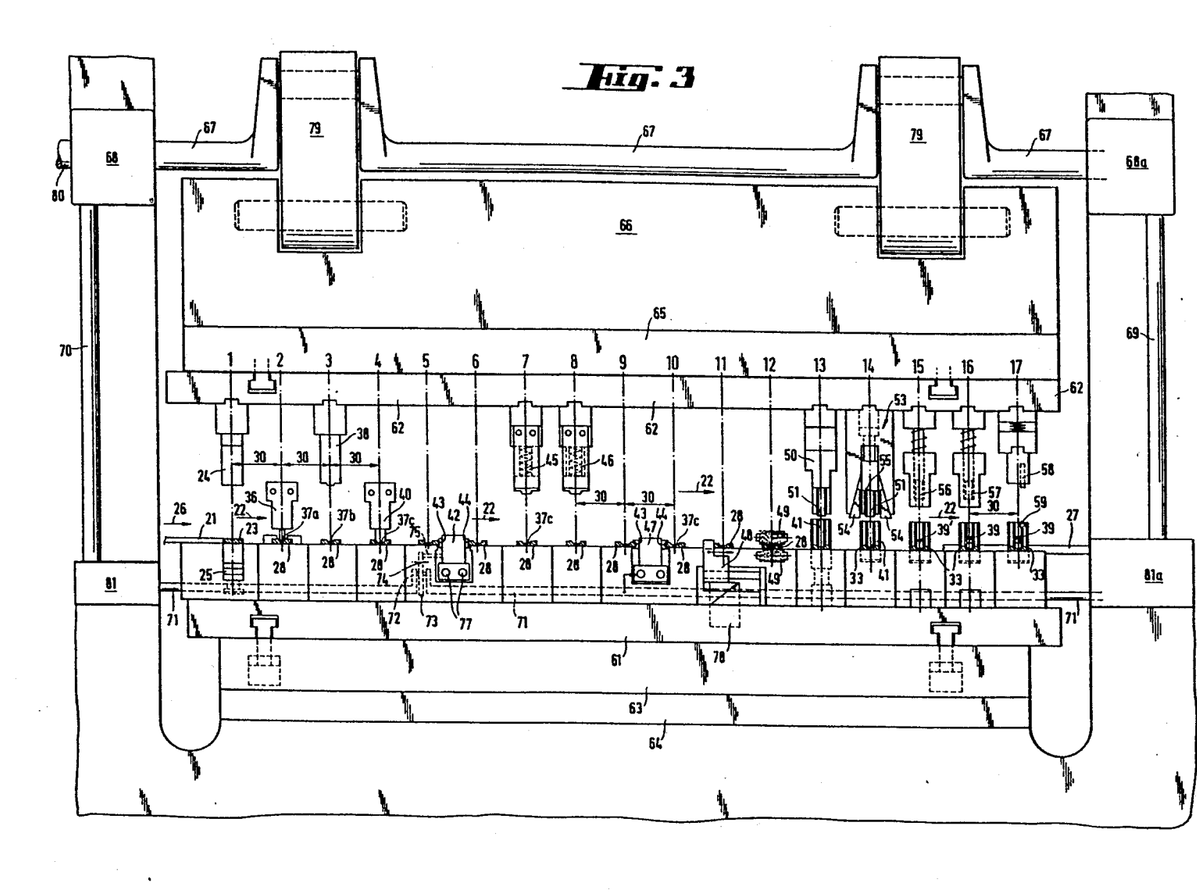
FIG. 3 is a schematic general layout of the machine according to FIG. 2, including its drive mechanisms.

As may be seen from FIG. 3, in order to open and close the forming and stamping dies and actuate the cutoff tool of "Stage 1", the top plate 62 carrying these tools is connected via an intermediate plate 65 to the ram 66 which, in turn, is linked by two or more bars 79 to a crankshaft 67 mounted in the upper part of the machine. The crankshaft 67 is driven by a driveshaft 80 in a rotary or back and forth motion, there being provided and driven together with the crankshaft 67, first and second cam arrangements 68 and 68b, from which are derived a driven linkage 69 to drive through an intermediate gear 81a the transport mechanism 27, and through a driven linkage 70 to drive the mechanism through an intermediate gear 81 respectively. The driven linkage 70 leads via the intermediate gear 81a to a rockershaft 71 which extends along the tool base plate 61 above the clamping plate 63 and the press table 64 and the row of all processing stations "Stage 1" through "Stage 17". This rockershaft 71 has at every station, or at least at every station containing chip-generating cutting tools, a crank part 72, FIG. 4, and is driven in back and forth motion, in synchronism with the crankshaft 67, by the intermediate gear 81. Above the crank part 72 there is installed, in those stations which contain chip-generating cutting tools 76 movable transverse to the transport direction 27, a fork-shaped rocker arm 73 which pivots about a trunnion 74 above its lower forked part. At its end opposite its lower forked part, the rocker arm 73 is provided with a second forked part which engages a pivot pin 75 of the tool 76 which is movable back and forth in the ways 77 in the sense of the double arrow. This brings about a back and forth motion of the tool 76 transverse to the transport direction 22 and in synchronism with the motion of the crankshaft 67 and, hence, of the ram 66 supporting the forming and stamping dies.

Figure 4:
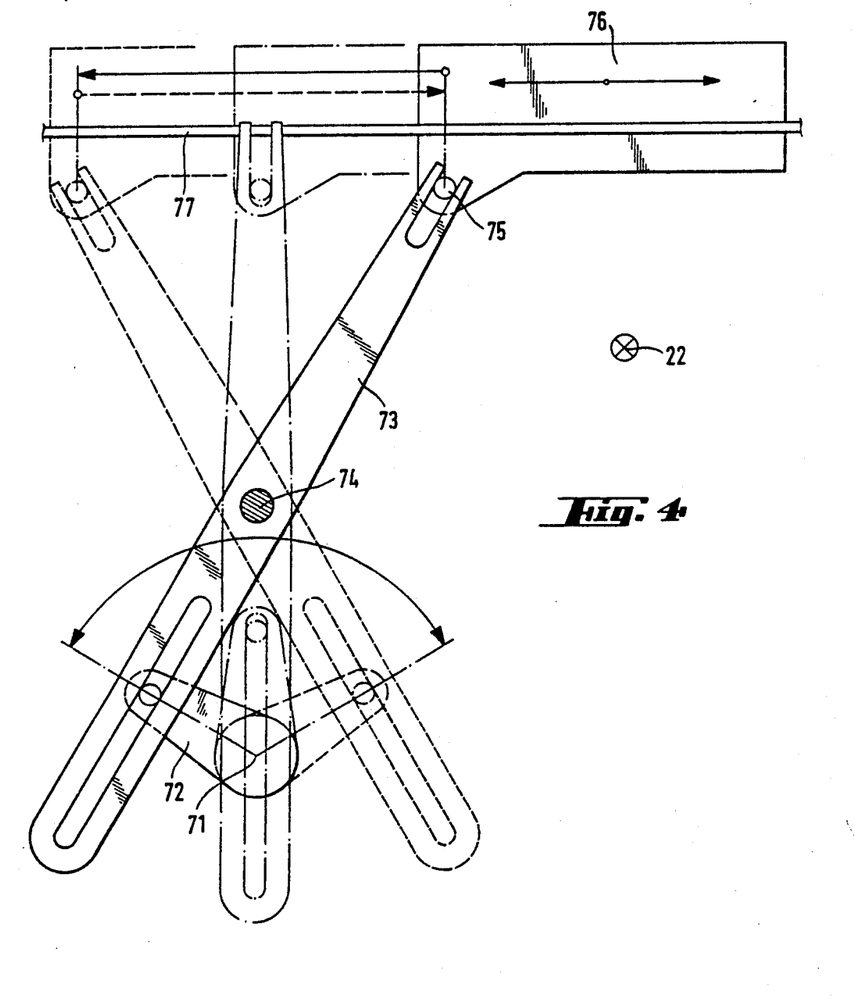
FIG. 4 is a schematic for the generating of movement and guiding of chip removal tools.

If chip-generating cutting tools must be moved in the transport plane parallel to the transport direction, this can be accomplished by a deflection gear 78 to be attached to the rocker-shaft 71. This provides for the motion of tools for chip-generating machining to be moved parallel to the transport direction in synchronism with the motion of ram 66 and the motion of the forming and stamping dies supported by the latter.

In a modification of the embodiment example illustrated, a ribbon material could also be fed in, which is of slightly greater width than the desired axial width of the friction bearing parts 20 to be produced. This ribbon material would be introduced into the station "Stage 1" at right angles to the transport direction 22 and cut in the cutting station "Stage 1" with a cut parallel to the transport direction 22 to form strips 23 whose length is somewhat greater than the desired circumferential length of the friction bearing cup 20, i.e. corresponding to the dimensions of strip 23 per FIG. 1, part a.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

List of reference symbols:

| | |
|---|---|
| 20 | Semi-cylindrical bearing part |
| 21 | Ribbon material |
| 22 | Transport direction |
| 23 | Strip |
| 24 | Stamping and cutting die |
| 25 | Counterpressure die |
| 26 | Feeding direction |
| 27 | Transport mechanism |
| 28 | Plate |
| 29 | Double arrow |
| 30 | Space interval |
| 31 | Part or section of transport mechanism |
| 32 | Part or section of transport mechanism |
| 33 | Curved bearing part or molding |
| 34 | Gripping and holding element, or nest |
| 35 | Gripping and holding element, or nest |
| 36 | Tools |
| 37 | Circumferential groove in 20 |
| 37a | Groove in processing stages |
| 37b | Groove in processing stages |
| 37c | Groove in processing stages |
| 38 | Die, stamping die |
| 39 | Elongate hole in 20 |
| 39' | Round hole in 20 |
| 40 | Die |
| 41 | Groove |
| 42 | Processing device |
| 43 | Axial front face |
| 44 | Axial rear face |
| 45 | Cutting and stamping die |
| 46 | Shaving and smoothing device |
| 47 | Processing Device |
| 48 | Processing Device |
| 49 | Cleaning or brush device |
| 50 | Male bending die |
| 51 | Projection |
| 52 | Female bending die |
| 53 | Swaging tool or upsetting die |
| 54 | Forming tool |
| 55 | Upsetting die |
| 56 | Hole punching die |
| 57 | Hole punching die |
| 58 | Cutting and bending tool |
| 59 | Arresting element |
| 61 | Die base plate |
| 62 | Top plate |
| 63 | Clamping plate |
| 64 | Press table |
| 65 | Intermediate plate |
| 66 | Ram |
| 67 | Crankshaft |
| 68 | First Cam arrangement |
| 68a | Second Cam arrangement |
| 69 | Driven linkage for 27 |
| 70 | Driven linkage for 71 |
| 71 | Rockershaft |
| 72 | Crank part |
| 73 | Rocker arm |
| 74 | Trunnion |
| 75 | Pivot pin |
| 76 | Tool |
| 77 | Ways |
| 78 | Deflection gear |
| 79 | Rod or bar |
| 80 | Driveshaft |
| 81 | Intermediate gear |
| 81a | Intermediate gear |

We claim:

1. A machine for producing shaped friction bearing parts from ribbon-like composite laminate material, wherein the composite laminate material in the form of a ribbon is fed along a transport direction, to a processing line of the machine, said machine having a multiplicity of successive work stations to carry out various processing steps each of which is constituted as a work stroke until a finished bearing part is produced except for any machining of sliding surfaces, said composite laminate ribbon material being transported for this purpose to the processing line of the machine in feeding steps which occur timewise between work strokes, said machine comprising, in combination:

(a) means providing a plurality of successive, spaced-apart work stations at which operations are performed on said composite laminate ribbon material, (b) means for supporting and guiding said composite laminate ribbon material which is being transported to said successive work stations, (c) chip-forming tool means at said successive work stations for effectively performing chip-forming operations on said composite laminate ribbon material, (d) cutting means at one of said successive work stations, for cutting said laminate ribbon material to form bearing blanks in a form of friction bearing plates, (e) gripping means for individually gripping said plates and transporting the same consecutively in the transport direction to said successive work stations to have machining operations performed on them, (f) chip-removal means disposed adjacent said successive work stations, for effecting removal of chips from work on said plates as caused by operation of said chip-forming tools on said plates, and (g) common drive means to provide power for operating said cutting means, said transporting means, said tool means and said chip-removal means.

2. A machine according to claim 1, characterized further that the common drive means contains a crankshaft (76) and a crank drive (66, 67) to open and close dies and tools for forming and cutting, and there is a driven mechanism (66, 70 to 78) attached to the said crankshaft (76) to generate cutting tool motions transverse to the transport direction (22).

3. A machine according to claim 1, characterized further that means is provided comprising a machining station (5 to 10 and 12) for machining reference faces (43, 44) of said friction bearing plate (28), and devices (36, 38, 40) are provided for producing circumferential grooves (37) in said plates (28), said devices being disposed ahead, in the transport direction, of said machining station.

4. A machine according to claim 1, characterized further that devices are provided for producing circumferential grooves (37) in the plates (28), said devices containing exclusively stamping dies which are disposed in a work stamping station.

5. A machine according to claim 1, characterized further that devices are provided for producing circumferential grooves (37) in the plates (28), said devices containing exclusively cutting tools disposed in a work cutting station.

6. A machine according to claim 1, characterized further that means are provided for machining of the axial faces (43, 44) of said friction bearing plate, said means comprising two successive stations having machining devices (42) with cutting tools which are passed in a direction transverse to the transport direction (22) between two neighboring stations (stages 5 and 6) and which are simultaneously guided along lateral edges of the plates (28) which are chucked in said stations, to effect simultaneous machining of two plates (28).

7. A machine according to claim 1, characterized further that means are provided for the machining of chamfers at the faces (43, 44) of said friction bearing plate (20), said means comprising two successive stations having machining devices (47) with cutting tools which are passed in a direction transverse to the transport direction (22) between two neighboring stations and which are simultaneously guided along lateral edges (43, 44) of the plates (28) which are chucked in said stations, to effect simultaneous machining of two plates.

8. A machine according to claim 1, characterized further that the gripping and transport means (27) is equipped with gripping and holding elements (34, 35) engaging subsequent reference face areas of the said plates (28).

9. A machine according to claim 1, characterized further that the gripping and transport means (27) pass uninterruptedly through all said work stations and has two part sections (31, 32) comprising a part section (31) for the transportation of the said plates (28) and a part section for the transportation of friction bearing shells (33) formed of the plates.

10. A machine according to claim 1, and further including alignment means for establishing and maintaining predetermined alignment with respect to said tool means, of the bearing plates in at least one of said work stations.

11. A machine according to claim 1, characterized further that devices (36, 38, 40) are provided for producing circumferential grooves (37) in said plates (28), said devices containing both cutting tools (36, 40) and stamping dies (38).

12. A machine according to claim 11, characterized further that the devices (36, 38, 40) for producing circumferential grooves (37) contain tools distributed over three successive stations, namely devices (36) contained in one machining station (stage 2) to rough-broach the groove (37a), and stamping tools (38), contained in a succeeding station (stage 3) to widen and deepen the groove (37b) by stamping, and cutting tools (40) disposed in a succeeding third machining station (stage 4) to finish-machine the groove (37c) by finish-broaching.

13. A machine according to claim 11, characterized further that the devices to produce circumferential grooves (37) in the friction bearing plates (28) contain tools, distributed over three successive stations, comprising a first machining stage to rough broach the groove in the plate (28), a cutting tool stage contained in a succeeding station to widen and deepen the groove by continued broaching, and dies disposed in a succeeding third stage, to finish-stamp the groove.

* * * * *